Patented July 7, 1936

2,046,925

UNITED STATES PATENT OFFICE 2,046,925

ADHESIVE

Overton W. Pendergast, Terre Haute, Ind.

No Drawing. Original application October 10, 1932, Serial No. 637,332. Divided and this application August 3, 1933, Serial No. 683,549

6 Claims. (Cl. 134—23.5)

This invention relates to adhesives and is a division of co-pending United States application, Serial Number 637,332, filed October 10, 1932.

In many of the arts it is desirable to employ an adhesive which will not require the application of a moistener, such as water, to the adhesive in order to cause its carrier to adhere to a surface. Also, it is desirable to have an adhesive of the kind just described, which may be applied as a coating to a carrier and by the application of pressure only will cause the carrier to adhere to a supporting surface, but may be easily peeled or removed from that surface, leaving no indication of its presence on said surface, and may be reapplied to other similar surfaces with the same results. In addition, it is desirable, particularly in the printing art, to be able to provide an adhesive which may be printed upon or similarly treated without causing the adhesive to adhere to the type or other imprinting means and which will satisfactorily carry the impressed ink or other medium. A carrier coated with such an adhesive and imprinted with suitable indicia would be very desirable used as a temporary or permanent label or sign to be affixed to automobile windshields, show windows, show cases, bottles, jars and the like.

An object of this invention is to provide an adhesive which may be employed to coat material adapted to be handled extensively such as in counting, jogging, press feeding, bundling and the like.

Another object is to provide an anti-tacky adhesive which will leave no residue on the surface to which its carrier is applied, including surfaces which are affected by heat and cold, such as glass which may be subjected to the sun rays or to cold winds.

Another object is to provide a sensitive-to-pressure adhesive which will cause its carrier, such as paper and the like, to adhere to a highly polished surface, such as glass, but will not cause its carrier to adhere to another sheet of paper or the like.

Another object is to provide a sensitive-to-pressure adhesive which will permit its carrier such as paper, cloth, or the like, to be applied, removed and reapplied almost indefinitely to a highly polished surface such as glass.

Still another object of the invention is to provide such an adhesive which will not cause its carrier to warp or curl when applied or when the adhesive is subjected to atmospheric changes.

Another object is to provide an adhesive which may be applied to carriers such as two sheets of paper, the adhesive-applied surfaces thereupon pressed together and which adhesive will cause the two sheets to mutually adhere until peeled apart, whereupon the adhesive will present a smooth surface.

Still another object is to provide an adhesive which may be printed upon or similarly treated and will not come away upon the imprinting instrument nor cause the printing ink or similar substance to run.

Another important object is the provision of an adhesive requiring the application of no water, in order to cause it to adhere to a surface.

Still another object is to provide an adhesive which will form a coating so tough and strong that a carrier employed may be relatively weak, light weight, and the like.

Other objects and advantages of the invention will be apparent during the course of the following detailed description of the improved adhesive.

Primarily the improved adhesive is composed of a mixture of a cellulose derivative in a suitable vehicle or solvent and a vegetable oil or gum such as castor oil or camphor.

The cellulose derivative is preferably cellulose nitrate (nitrocellulose) altho cellulose acetate (sericose) may be employed, both being insoluble in water. As to cellulose nitrate, it is preferred to employ what is commonly known as 30 second cellulose nitrate. In the specification and claims, the term cellulose derivative will be employed as a generic term for both cellulose nitrates, cellulose acetates and cellulose esters. The vehicle or solvent is preferably a quickly evaporable or dissipatable one and the preferred solvent comprises butyl acetate 25 per cent by volume, butanol 10 per cent by volume, ethyl acetate 10 per cent by volume, ethyl alcohol 5 per cent by volume, toluol 50 per cent by volume. This solvent is chemically inert toward castor oil but while the cellulose nitrate will not dissolve in alcohol alone (and for that reason the several compounds named above are preferably employed to provide for the satisfactory dissolution of the cellulose nitrate), the castor oil will dissolve in alcohol and thus be well mixed in the resulting adhesive.

As for the vegetable oil, the one commonly known as castor oil or ricinus oil is preferably employed, and in a substantially chemically pure condition. Not only does the employment of castor oil give the sensitive-to-pressure qualities to the adhesive but it also prevents the carrier, if of paper, from drawing and warping and keeps the adhesive just in the most satisfactory condition so that it will not be tacky (by which term it should be understood that the adhesive will not separate in a stringy manner from a suitable supporting surface when peeled therefrom nor will it adhere to printers' type and the like) but will present a smooth surface even when two faces of the adhesive are brought into contact one with the other and then drawn apart (peeled from each other).

In preparing the adhesive, the cellulose derivative and solvent are mixed together and the third ingredient mixed with a certain part of the resultant solution.

The preferred formula comprises 8⅓ parts by volume of 30 second cellulose nitrate and 75 parts by volume of the solvent. To 8 parts by volume of the resultant solution add 1½ to 2 parts by volume of chemically pure castor oil.

Thus it will be seen that the adhesive is comprised of approximately 80 per cent of the solution before loss of the solvent, and that the adhesive contains between 14 to 21 per cent of castor oil.

In order to produce a coating of the adhesive which is practically dry to the touch, but which has, nevertheless, a slight degree of adhesiveness, such degree being so small that the adhesive will adhere to practically nothing except glass and then only by thoroughly rubbing and pressing the carrier against the glass, the castor oil represents approximately 14 per cent by volume of the adhesive prior to the dissipation of the solvent.

For most purposes however, it is desirable to employ substantially 20 per cent by volume of castor oil, this percentage representing the amount of castor oil by volume in the adhesive prior to the dissipation of the solvent.

However, if the adhesive is to be employed simply as a sensitive-to-pressure adhesive and the carrier or adhesive is not to be impressed, a larger volume of castor oil may be employed,— up to equal parts by volume of castor oil and the above solution. This increased castor oil content will cause the adhesive to adhere to other surfaces than smooth ones, and still pull away (peel) satisfactorily, if there is not a great deal of heat to be encountered, as the direct rays of the summer sun.

The adhesive thus prepared is substantially transparent and may be employed that way. However, if desired, suitable water insoluble coloring matter may be added, such as the alizarin dyes.

The adhesive is one which may be put up in jars or tubes and sold to users who may employ the adhesive as are ordinary pastes and mucilage. When so employed, the adhesive is applied to a carrier such as paper, and before it is allowed to become dry to the touch, the carrier may be affixed to a suitable surface such as paper and will then adhere so that the papers will not pull apart. Applied either this way or for the purpose of providing a sensitive-to-pressure adhesive, a roller, brush, or the like may be used.

In my co-pending application, the fact is brought out that the adhesive may be applied to a suitable carrier, such as paper, which can be readily softened and removed by the application of water, the article of manufacture applied to a smooth surface and the carrier removed by the application of water, whereupon the adhesive and imprint will remain upon the smooth surface until peeled off in its entirety as a sheet. In fact it may be reapplied by pressure to another suitable supporting surface.

Various changes may be made to the form of invention herein shown and described, without departing from the spirit of the invention or the scope of the claims.

What is claimed is:

1. A sensitive-to-pressure adhesive comprising a mixture of approximately .8 part by volume of a cellulose derivative, a solvent therefor, and approximately 1½ to 2 parts by volume of castor oil.

2. A sensitive-to-pressure adhesive comprising a mixture of a cellulose derivative, castor oil of substantially 65.3 per cent to 71.5 per cent by volume of said cellulose derivative-castor oil mixture, and a solvent for said cellulose derivative.

3. A sensitive-to-pressure adhesive comprising a mixture of cellulose nitrate, castor oil of substantially 65.3 per cent to 71.5 per cent by volume of said cellulose nitrate-castor oil mixture, and a solvent for said cellulose nitrate, chemically inert toward said castor oil.

4. An adhesive, capable of being peeled from a smooth surface in its entirety and capable of being reaffixed to a smooth surface by pressure alone, including substantially 8 parts of a cellulose derivative-solvent solution, said solution consisting of substantially 8⅓ parts cellulose derivative and substantially 75 parts solvent, and from 1½ to 8 parts of a sensitive-to-pressure imparting ingredient, said ingredient being castor oil, said percentages being by volume.

5. An adhesive, characterized by being peelable and being sensitive-to-pressure, whereby it may be applied to a smooth surface, and will adhere thereto, may be peeled therefrom in substantially its entirety and may be reapplied to readhere to the same or a substantially similar surface by the application of pressure alone, containing a cellulose derivative, castor oil, said castor oil comprising between 65.3 per cent and 71.5 per cent by volume of the cellulose derivative-castor oil content, and a solvent for said cellulose derivative.

6. An adhesive, characterized by being peelable and being sensitive-to-pressure, whereby it may be applied to a smooth surface, and will adhere thereto, may be peeled therefrom in substantially its entirety and may be reapplied to readhere to the same or a substantially similar surface by the application of pressure alone, containing cellulose nitrate, castor oil, said castor oil comprising between 65.3 per cent and 71.5 per cent by volume of the cellulose nitrate-castor oil content, and a substantially colorless solvent for said cellulose nitrate.

OVERTON W. PENDERGAST.